United States Patent
Ohya et al.

(10) Patent No.: US 7,261,405 B2
(45) Date of Patent: Aug. 28, 2007

(54) INK-JET RECODING METHOD AND RECORDED MATTER

(75) Inventors: Hidenobu Ohya, Hachioji (JP); Makoto Kaga, Hachioji (JP); Kei Kudo, Hachioji (JP); Shinsaku Kashiwamura, Hachioji (JP); Teruyuki Fukuda, Hachioji (JP); Yuki Ogasawara, Hino (JP)

(73) Assignee: Konica Minolta Holdings, Inc., Tokyo (JP)

( * ) Notice: Subject to any disclaimer, the term of this patent is extended or adjusted under 35 U.S.C. 154(b) by 403 days.

(21) Appl. No.: 10/940,451

(22) Filed: Sep. 14, 2004

(65) Prior Publication Data
US 2005/0062819 A1    Mar. 24, 2005

(30) Foreign Application Priority Data
Sep. 18, 2003    (JP) ............................ 2003-325929

(51) Int. Cl.
*G01D 11/00* (2006.01)

(52) U.S. Cl. .................................... 347/100; 347/96
(58) Field of Classification Search ................ 347/100, 347/101, 95, 96; 106/31.27, 31.6, 31.13; 523/160
See application file for complete search history.

(56) References Cited

U.S. PATENT DOCUMENTS

| | | | |
|---|---|---|---|
| 6,511,170 B1* | 1/2003 | Gallo et al. | 347/100 |
| 7,086,726 B2* | 8/2006 | Takashima et al. | 347/100 |
| 2003/0085974 A1* | 5/2003 | Shimomura et al. | 347/101 |

* cited by examiner

*Primary Examiner*—Manish S. Shah
(74) *Attorney, Agent, or Firm*—Lucas & Mercanti, LLP (57) ABSTRACT

An ink-jet recording method of recording an ink-jet recording ink containing at least a water-soluble dye and a resinous micro-particle dispersion on an ink-jet recording medium, comprising steps of providing a colorless ink on at least a part of the ink-jet recording medium by a liquid providing section separately installed from a recording section for the ink-jet recording ink, wherein the colorless ink contains at least a resin and is substantially colorless.

28 Claims, 2 Drawing Sheets

INK-JET RECODING METHOD AND RECORDED MATTER

FIELD OF THE INVENTION

The present invention relates to a new ink-jet recording method and recorded matter.

BACKGROUND OF THE INVENTION

In recent years, advancing of an ink-jet technique is remarkable and is combined with development of a printer technique, an ink technique, a technique of a recording medium for exclusive use for an ink-jet recording so that an image quality provided by them becomes refer to as photographic-quality. With enhancement of image quality, preservation of ink-jet image becomes to compare with a conventional silversalt photography, in particular, in dye-based ink, deterioration with transfer of a color agent such as weakness ink-jet image in water resistance of and blur resistance, deterioration with chemical reaction of color agent characteristic such as weakness in light resistance and oxidation gas resistance are pointed out.

Especially, in recent years, color deterioration of ink-jet recording image by ozone gas included in trace within atmosphere becomes a problem.

In a purpose of image conservation enhancement of recording image by the dye-based ink which the problem is mentioned above, a trial to form a layer by resin on an imaging surface has been made.

For example, in Japanese Patent Laid-Open No. 59-222381, Japanese Patent Laid-Open No. 4-21446, 10-315448, 11-5362, 11-192775, the thermoplastic organic polymer particle layer is made for the most surface layer of an ink-jet recording medium, then, after image recording, this thermoplastic organic polymer particle is fused to become a layer, as a result, water resistance, a weatherproof upgrade and a glossiness grant of image are achieved by forming protective layer of polymer.

According to this method, although some effect is observed in image conservation enhancement, an application of heat fuser for exclusive use of an exclusive ink-jet recording medium being necessary becomes necessary, and, in addition, a blister by evaporation of an ink solvent occurs in application of heat fixing, fusing, and film let-go occurs, and control holds learning activity that it is difficult. Further the thermoplastic organic polymer grain layer of the most outermost layer comprises defect obstructing ink absorbency.

On the other hand, TOKKAI No. S55-18412 and No. H11-199808 offer a method of improving water resistance and light resistance of ink by adding fine particles of latex or resin.

Further, TOKKAI No. 2001-187852 and No. 2002-240413 disclose adding of resin to ink to improve ozone resistance of the ink. Still further, TOKKAI No. 2002-80759, 2002-194253, 2002-264490, 2002-285049, and 2003-55586 disclose a technology of adding fine particles of latex or resin to ink.

Although a method of adding fine particles of latex or resin to ink has an effect on preventing color deterioration caused by ozone gas, to a certain degree, it has been proved that the method has the following problem.

The first problem is that the glossiness of parts provided with ink is increased, and that of white background parts remain unchanged. As a result, differences in glossiness between image parts and non-image parts can be caused.

The second problem is that although a satisfying effect on preventing color deterioration caused by ozone gas can be recognized in high concentration parts and in an intermediate concentration parts with a large amount of ink, the effect to parts provided with a small amount of ink is not enough. Consequently, deterioration in the parts provided with a small amount of ink becomes even more apparent. Or, although a satisfying effect on preventing color deterioration due to ozone gas can be recognized in parts in a secondary color or a multidimensional color, the effect to parts in a nearly saturated color, concretely, to parts in cyan or magenta color is not enough. Thus, color deterioration in a nearly saturated color becomes apparent, hereby the degree of color deterioration differs depending on scenes in an image, which makes an unnatural image.

The third problem is that, in image parts neighboring white background parts, effect of preventing color deterioration caused by harmful gasses such as ozone gas is not achieved enough. It is understood that this is caused by entry of ozone gas from neighboring white background parts and diffusion into image parts.

As a solution of the above problems, TOKKAI No. H09-262971, 2000-225695, and 2000-335043 disclose a technology of providing a laminating agent on an image to improve the preservability of the image. This technology can be understood to be a technology of providing a laminating agent on an entire image. However, in parts provided with a large amount of recording ink, this technology causes an image degradation and a decrease in glossiness due to spilling of ink, and even worsens color deterioration, which could be improved otherwise, wherein the technology is not successful in solving the problems described in the present invention.

Also, International Patent No. 00/06390 and TOKKAI 2001-39006 disclose a technology of providing a liquid containing colorless fine resinous particles on parts with a large amount of ink deposited thereon, to improve the preserving ability or glossiness of an image. However, by this technology, differences in glossiness depending on parts in a print are not prevented, and the effect on preventing color deterioration due to ozone gas in image parts neighboring white background parts is not obtained, further resulting in degradation in image quality and glossiness due to spilling of ink in parts provided with recording ink.

On the other hand, there is disclosed a technology of providing colorless ink into regions where ink is not provided. For example, there is disclosed a technology in which ink containing a coloring agent, a resin emulsion, and sugar is deposited on a recording medium that is a transparent base material provided with a porous ink receiving layer thereon, and clear ink having a reflective index with a difference of 0.1 or less from that of the above ink is recorded on blank parts where color ink is not recorded, thereby forming an image with a high transparency (for example, refer to TOKKAI No. H08-85218). Further, there is also disclosed a technology of reducing the distortion of ruled lines in a low humidity environment by compensation with colorless ink to achieve a predetermined recording rate in regions surrounding an image (for example, refer to TOKKAI No. 2001-47644).

Further, there is disclosed a black and white image forming method that improves the graininess and sharpness by providing non-image parts with colorless ink containing fine resinous particles, when using special black inks of more than one kind having different concentrations (for example, refer to TOKKAI No. 2001-277488). However, in these disclosed technologies, there is no description that evenness in glossiness and resistance to color deterioration due to ozone gas in an image, which is a problem described in the present invention, is improved, and also, effects obtained by these technologies are not enough.

Also, in International Patent No. 03/24723A1, there is disclosed a method that uses a recording medium containing thermoplastic resinous particles and performs a heating process after recording, wherein a colorless or white colored liquid is provided on a print before the heating process. However, there is no description that the method improves evenness in color deterioration due to ozone gas in an image. Further, there are limitations by the requirement for a dedicated heat-processing unit, the requirement for a dedicated recording medium, and others.

There is also offered a method for reducing differences in glossiness appearance by providing parts complementary to a visible image with ink that keeps the color tone of a recording material unchanged (for example, refer to TOK-KAI 2003-191601). Further, there is a description that since exposure of a recording material is reduced by this method, it is expected that light resistance and ozone resistance are improved. However, there is no suggestion for a specific solution to eliminate unevenness in color deterioration caused by ozone, which is possible as a result of effects on preventing development of color deterioration due to ozone in highlighted parts and monochromatic parts, and preventing color deterioration due to ozone in image parts, which is a problem recognized in the present patent application. In embodiments, also, there are various limitations by a requirement for a dedicated unit for adding a photo-curing chemical compound to recording ink to perform photo-curing processing on a print, and by others.

The present invention has been devised taking the above problems into account. The first object of the invention is to provide an ink-jet recording method and recorded matter that are excellent in evenness in color deterioration, which is realized by reducing color deterioration caused by harmful gases such as ozone gas, in various concentration regions and in image regions in different colors. The second object of the invention is to provide an ink-jet recording method and recorded matter that reduce differences in glossiness in a print. The third object of the invention is to provide an ink-jet recording method and recorded matter that improve evenness in color deterioration caused by ozone and in glossiness, as described above, without performing specific post-processing on a print, such as heating, pressing, or projecting light. The fourth object of the invention is to provide an ink-jet recording method and recorded matter that reduce degradation in image quality caused by generation of leakage or beads of ink, or the like.

SUMMARY OF THE INVENTION

The above-mentioned purpose of this invention is attained by the following structures.

(1) An ink-jet recording method is characterized in that in an ink-jet recording method which records an ink-jet recording ink containing at least a water-soluble dye and a resinous micro-particle dispersion on an ink-jet recording medium, a colorless ink which contains as least a resin and is substantially colorless is provided to at least a part of the ink-jet recording medium by a liquid providing means installed apart from the record means of this ink-jet recording ink.

(2) The ink-jet recording method described in the above (1) is characterized in that the amount of the above-mentioned colorless ink provided to the ink-jet recording medium is made variable according to the providing amount of the above-mentioned ink-jet recording ink for every record part.

(3) The ink-jet recording method described in the above (1) or (2) is characterized in that the resin in the above-mentioned colorless ink is a resin fine particulate dispersion.

(4) The ink-jet recording method described in any one of (1) to (3) is characterized in that the above-mentioned water-soluble dye is an anthrapyridone dye represented by the following general formula (1) or a general formula (2).

(5) The ink-jet recording method described in any one of (1) to (3) is characterized in that the above-mentioned water-soluble dye is the azo dye which is formed by connecting a hetero ring and a hetero ring via an azo group.

(6) The ink-jet recording method described in any one of (1) to (5) is characterized in that the above-mentioned water-soluble dye is metal phthalocyanine dye having an oxidation potential higher than 0.8 V.

(7) The ink-jet recording method described in any one of (1) to (5) is characterized in that the above-mentioned ink-jet recording ink contains 1,2-alkyldiol.

(8) The ink-jet recording method described in any one of (1) to (7) is characterized in that the above-mentioned colorless ink contains 1,2-alkyldiol.

(9) The ink-jet recording method described in any one of (1) to (8) is characterized in that the average particle diameter of the above-mentioned resinous particles contained in the above-mentioned recording ink is 10-200 nm.

(10) The ink-jet recording method described in any one of (1) to (8) is characterized in that the average particle diameter of the above-mentioned resinous particles contained in the above-mentioned recording ink is 10-150 nm.

(11) The ink-jet recording method described in any one of (1) to (8) is characterized in that the average particle diameter of the above-mentioned resinous particles contained in the above-mentioned recording ink is 10-100 nm.

(12) The ink-jet recording method described in any one of (1) to (11) is characterized in that the content of the above-mentioned resinous particles in the recording ink is 0.2 to 10 weight %.

(13) The ink-jet recording method described in any one of (1) to (11) is characterized in that the content of the above-mentioned resinous particles in the recording ink is 0.5 to 5 weight %.

(14) The ink-jet recording method described in any one of (1) to (13) is characterized in that the minimum film forming temperature (MFT) of the above-mentioned resinous particles contained in the above-mentioned recording ink or colorless ink is −60–60 degree C.

(15) The ink-jet recording method described in any one of (1) to (14) is characterized in that the above-mentioned colorless ink is provided to at least a part of the region where recording ink is not provided.

(16) The ink-jet recording method described in any one of (1) to (15) is characterized in that the amount of the above-mentioned colorless ink provided to the ink-jet recording medium is made variable according to the providing amount of the above-mentioned ink-jet recording ink for every record part.

(17) The ink-jet recording method described in any one of (1) to (16) is characterized in that the above-mentioned colorless ink is given to at least a part of pixels in which amount of recording ink given to per pixel is 5 ml/m² or less.

(18) The ink-jet recording method described in any one of (1) to (16) is characterized in that the above-mentioned colorless ink is given to at least a part of pixels in which amount of recording ink given to per pixel is 8 ml/m² or less.

(19) The ink-jet recording method described in any one of (1) to (8) is characterized in that the above-mentioned colorless ink is not given to pixels in which amount of recording ink given to per pixel is 12 ml/m² or more.

(20) The ink-jet recording method described in any one of (1) to (19) is characterized in that in the region or a pixel to which colorless ink is given, the providing amount of colorless ink is 2-15 ml/m².

(21) The ink-jet recording method described in any one of (1) to (20) is characterized in that the total amount of the amount of recording ink and the amount of colorless ink is adjusted to become a fixed range for every pixel.

(22) The ink-jet recording method described in any one of (1) to (21) is characterized in that the total amount of the amount of recording ink and the amount of colorless ink is adjusted to become 2 ml/m² or more for every pixel.

(23) The ink-jet recording method described in any one of (1) to (21) is characterized in that the total amount of the amount of recording ink and the amount of colorless ink is adjusted to become 8 ml/m² or more for every pixel.

(24) The ink-jet recording method described in (15) or (16) is characterized in that the providing amount of the colorless ink per above-mentioned pixel decreases according to the increase in the providing amount of the recording ink per pixel.

(25) The ink-jet recording method described in (15) or (16) is characterized in that the total amount of resin of the resinous particles contained in the above-mentioned recording ink given to per pixel and the resin contained in the above-mentioned colorless ink given to per pixel is 0.5 g/m² or more.

(26) The ink-jet recording method described in (15) or (16) is characterized in that the above-mentioned total amount of resin is 1 g/m² or more.

(27) The ink-jet recording method described in (16) or (26) is characterized in that the above-mentioned pixel is a pixel below 1 mm².

(28) The ink-jet recording method described in any one of (1) to (27) is characterized in that the above-mentioned ink-jet recording medium is provided with a porous type ink absorptive layer containing filler and binder as principal components on waterproof support.

(29) A recorded matter characterized by being produced by the ink-jet recording method described in the above (1) to (28).

According to this invention, in various density regions and different color picture regions in a picture, ozone discoloring resistance and the uniform glossiness are improved, and the ink-jet recording method and record product in which image quality degradation by ink flowing and beading generation is refrained can be offered.

DETAILED DESCRIPTION OF THE PREFERRED EMBODIMENT

Although the best form for carrying out this invention is explained in detail hereafter, this invention is not limited thereto.

An ink-jet recording method of the present invention is an ink-jet recording method to recording ink-jet recording ink containing at least water-soluble dye and resinous micro-particle dispersion on an ink-jet recording medium, it is characterized in that substantially colorless ink containing at least resin is given to at least one part of the ink-jet recording medium by means of the liquid supplying device provided separately from a recording means of the ink-jet recording ink.

Firstly, an ink-jet recording ink according to the present invention is explained.

Ink-jet recording ink (hereinafter, referred merely recording ink) according to the present invention contains at least water-soluble dye and resinous micro-particles dispersion, the resinous micro-particle dispersion includes resinous particles in dispersion state in medium, for example in water, resinous micro-particles are referred to as polymer fine particles or latex.

The resinous micro-particles can be used in the form of water dispersion of various resins. Each resin of acrylic, styrene-acrylic, acrylonitrile-acrylic, acetic acid vinyl, vinyl acetate-acrylic, vinyl acetate-chlorination vinyl, polyurethane-based, silicon-acrylic, acryl silicon based, poly ester based, epoxy based can be given to be concrete.

These resinous micro-particles are usually provided by means of an emulsion polymerization method. As a surfactant, polymerization initiator used in the method, materials used in an ordinary method may be used. For example, as for a synthesis method of resinous micro-particles, it is described in U.S. Pat. Nos. 2,852,368, 2,853,457, 3,411,911, 3,411,912, 4,197,127, Belgium Patent No. 688,882, 691, 360, 712,823, Japanese Patent Publication No. 45-5331, Japanese Patent Laid-Open No. 60-18540, 51-130217, 58-137831, 55-50240 discloses in detail.

As for the resinous micro-particles to use with recording ink according to the present invention, it is preferable for mean particle size to be 10-200 nm, more preferably 10-150 nm, still more preferably it is 10-100 nm.

If the mean particle size of resinous micro-particles is 10 nm or more, since resinous micro-particles do not penetrate in the porous layer inside and resinous micro-particles reside on the surface of the porous layer, it is preferable with a glossiness-related aspect. Further, if the mean particle size of resinous micro-particles is 200 nm or less, since resinous micro-particles are small with some extent, it becomes advantageous in a leveling characteristic on the surface of porous layer and is desirable with an aspect of glossiness.

The mean particle size of resinous micro-particles can be measured simply by using a particle size measuring device, for example, Zetasizer 1000 (a product made by Malvern Ltd.) which can be obtained on the market and employed with light scattering method and a laser doppler method.

In recording ink according to the present invention, it is preferable that the content of resinous micro-particles in recording ink is 0.2-10 weight %, more preferably it is 0.5-5 weight %. If the added amount of resinous micro-particles is 0.2 weight % or more, enough effect can be shown for fading characteristic, if it is ten weight % or less, ink-jetting characteristics become more stable, further, it may be preferable that an increase in ink viscosity during storage can be restrained.

In resinous micro-particles according to the present invention, it is preferable for minimum film forming temperature (MFT) to be −60 to 60° C. In the present invention, film forming additive may be added to control minimum film forming temperature of resinous micro-particles. The film forming additive is called a plasticizing agent and is an organic compound to decrease the minimum film forming temperature of resin latex (normal organic solvent), for example, it is described by "Chemistry of Synthesis Latex (written by Soichi Muroi, published by Macromolecule Publication Society (1970))".

For example, for water-soluble dyes usable to recording ink according to the present invention, anthrapyridon dyes, azo dyes, methine dyes, azo methine dyes, xanthene dyes, quinone dyes, phthalocyanine dyes, triphenylmethane dyes, diphenyl methane dyes can be listed, for compound of the concreteness, for example, dyes illustrated in Japanese Patent Laid-Open No. 2002-264490 official gazette can be employed.

It is preferable for azo dye to be azo dye which coupled heterocycle with heterocycle in an azo group. It is preferable for phthalocyanine dyes to be the metal phthalocyanine dyes that the oxidation potential is higher than 0.8 V.

For anthrapyridon dyes, anthrapyridon dyes represented by the following general formula (1) or (2) are desirable.

General Formula (1)

General Formula (2)

In the above general formula (1), (2), R1 and R1' each represents a hydrogen atom or a substituent, as a substituent, an acyl group (for example, a benzoyl group, an acetyl group), an oxyacyl group (for example, an ethoxycarbonyl group), a carbamoyl group, a heterocycle group can be chosen.

R2 and R2' each represents a hydrogen atom or a substituent, as a substituent, an alkyl group (for example, a methyl group, an ethyl group), an aryl group (for example, a phenyl group) can be chosen.

R3 and R3' each represents an aryl group or a heterocycle group, R4 and R4' each represents a hydrogen atom or a substituent, as the substituent, an aryloxy group or a heterocyclic oxy group can be chosen.

For azo dyes, heterocyclic ring—heterocyclic ring azo dyes are preferable, heterocyclic ring—heterocyclic ring azo dyes are the dyes in which heterocyclic ring A is coupled with heterocyclic ring B in azo group, as heterocyclic rings A and B, heterocyclic ring having 5-to 6-membered rings can be listed. Heterocycle ring may be a monocyclic ring, and it may be a condensed-ring.

Preferably a pyrazole ring, an imidazole ring, a triazole ring, a thiophene ring, a thiazole ring, an iso-thiazole ring, a thiadiazole ring, a pyridine ring, a pyrazine ring, a pyrimidine ring, a pyridazine ring, a benzthiazole ring, a benzoxazole ring, a benzisothiazole ring, a pyrazoloazole ring can be listed as a heterocyclic ring selected as a heterocyclic rings A and B. Further, these heterocycle may comprise substituent.

As a preferred embodiments, it may be desirable that the heterocyclic ring A is a pyridine ring, and the heterocyclic ring B is a pyrazole ring, an imidazole ring, a thiazole ring, an isothiazole ring, and a benzothiazole ring.

For example, anthrapyridon dyes can be synthesized with reference to Japanese Patent Laid-Open Nos. 10-306221 and 11-29714, Japanese Patent Laid-Open Nos. 2000-109464, 2000-191660, 2000-256587, 2001-72884, 2001-139836, 2001-288091, 2002-332418, 2002-332419, 2003-55589, and 2003-192930.

Further, heterocyclic ring-heterocyclic ring azo dyes can be synthesized with reference to, for example, Japanese Patent Laid-Open No. 2002-309115, 2002-309116, and 2002-371079.

Especially, metal phthalocyanine dyes are preferable to obtain advantages of the invention, further, copper phthalocyanine dyes which electron-attracting group is substituted with a benzene ring is preferable. For an electron attracting group, a sulfonyl group, a sulfamoyl group, an acyl group, an oxycalbonyl group, an acyl oxy group, a carbamoyl group are desirable, and, above all, sulfonyl group, sulfamoyl group are desirable. These electron attracting group may comprise a substituent.

Although the oxidation potential of each dye specified in the present invention can be measured in accordance with a well-known electrochemical method, in the present invention, dyes are dissolved in water including a supporting electrolyte and the an oxidation potential of the dye is measured by a cyclic voltammetry method by using a silver/silver chloride electrode as a reference electrode.

Recording ink according to the present invention can contain organic solvents. Organic solvents are not particularly limited, but water soluble organic solvents are preferable, alcohols, polyhydric alcohols, polyhydric alcohol ethers, amines, amides, heterocycles can be listed as specific compounds, for example, as specific compounds, the water-soluble organic solvents which are illustrated in Japanese Patent Laid-Open No. 2003-231832 official gazette can be employed.

As 1,2-alkyldiol which is an organic solvent preferably contained in recording ink and colorless ink according to the present invention, it may be desirable those having 4-10 carbon atoms, for example, 1,2-butanediol, 1,2-pentanediol, 1,2-hexanediol, 1,2-heptanediol, 1,2-octanediol, 1,2-nonanediol, 1,2-decanediol, 1,2-cyclo hexanediols, 1,2-cyclooctanediol, 1,2-cyclohexanedimethanols, 5-hexan-1,2-diol, and 3,3-dimethyl-1,2-butanediols may be usable. As an added amount of 1,2-alkyldiol, it can be added in the range of 0.5-20 wt %.

In the recording ink according to the present invention, various kinds of surface active agents can be used. The surface active agent which can be used in the present invention are not particularly limited, but, for example, anionic surface active agents such as dialkylsulfosuccinic acid salts, alkylnaphthalenesulfonic acid salts, fatty acid salts, nonionic surface active agents such as polyoxyethylene alkyl ethers, polyoxyethylene alkyl aryl ethers, acetylene glycol, polyoxyethylene polyoxypropylene block copolymers, cationic surface active agents such as alkylamine salts, quaternary ammonium salts can be used. In particular, anionic surface active agents and nonion surface active agents can be used prefereably.

Further, in recording ink according to the present invention, high molecular weight surface active agents can be used, for example, styrene-acrylic acid-alkyl acrylate ester copolymerss, styrene-acrylic acid copolymers, styrene-maleic acid-alkyl acrylate ester copolymers, styrene-maleic acid copolymers, styrene-methacrylic acid-alkyl acrylate ester copolymers, styrene-methacrylic acid copolymers, styrene-maleic acid half ester copolymers, vinylnaphthalene-acrylic acid copolymers, vinylnaphthalene-maleic acid copolymers can be listed.

In the recording ink according to the present invention, in addition to the above explanation, in accordance with ejection stability, print head and ink-jet cartridge compatibility, storage stability, image preservation quality, and purposes of many ability enhancement, well-known various additives, for example, viscosity modifiers, specific resistance modifiers, film forming agents, UV absorbers, antioxidants, anti-discoloring agents, bactericiders, rust inhibitors can be chosen and used appropriately as necessary, for example, liquid paraffin, dioctyl phthalate, tricresyl phosphate, minute oil drop particles such as silicone oil, UV absorbers as described in Japanese Patent Laid-Open No. 57-74193, 57-87988 and 62-261476, anti-discoloring agent described by Japanese Patent Laid-Open No. 57-74192, 57-87989, 60-72785, 61-146591, Japanese Patent Laid-Open No. 1-95091 and 3-13376, fluorescent brightening agent described by Japanese Patent Laid-Open No. 59-42993, 59-52689, 62-280069, 61-242871 and Japanese Patent Laid-Open No. 4-219266 can be listed.

Next, colorless ink which is supplied by the liquid supplying device provided separately from a recording means of recording ink according to the present invention, contains at least resin and is substantially colorless, is explained. The colorless ink according to the present invention comprises resin and liquid medium, but preferably comprises resin, water-soluble solvents and water as a main component. As the resins, there may be no limitation if they create the effects of the invention, for example, any one of water-soluble resins and water-insoluble resins may be used, but water-insoluble resins dispersed in water is preferable in order to create the advantage of the invention effectively.

As specific examples of resins, it can be chosen among resins of acrylic, styrene-acrylic, acrylonitrile-acrylic, vinyl acetic, vinyl acetate-acrylic, vinyl acetate-chlorinated vinyl, polyurethane, silicon-acrylic, acryl silicon based, poly ester, epoxy based.

As organic solvents, surface active agents and the other additives which can be added to the colorless ink according to the present invention, those which can be added to the above recording liquid can be used.

It is desirable that the surface tension of recording ink according to the present invention and colorless ink is 40 mN/m or less to discharge stably and to raise high gloss appearance, ozone resistance, more preferable to be 20-40 mN/m due to the same reason, as for the ink viscosity, 1.5-10 mpa·s is preferable, and 3.0-8 mPa·s is more preferable, Next, the method of providing colorless ink will be explained.

Firstly, providing portion of colorless ink to the ink-jet recording medium and printing method will be explained.

As the providing portion of colorless ink, the colorless ink is provided to at least one part of an ink-jet recording medium. For advantage obtained by the invention, it is preferable for colorless ink to be provided to the portion to which a recording ink is not provided. Further, it is preferable for the colorless ink to be provided to the portion to which a recording ink is provided little. In order to obtain the effect of the present invention, it is preferable for colorless ink not to be provided to the portion to which a recording ink is provided too much.

A method of determining whether or not colorless ink is to be provided depending on a provided amount of a recording ink as stated above is a preferred method. That is, in ink-jet image recording, usually an image is divided into pixels and a recording ink providing amount for every pixel is determined on a basis of image data. Depending on this recording ink providing amount, a method of determining the providing amount of colorless ink according to the present invention is preferable.

Figure 1:
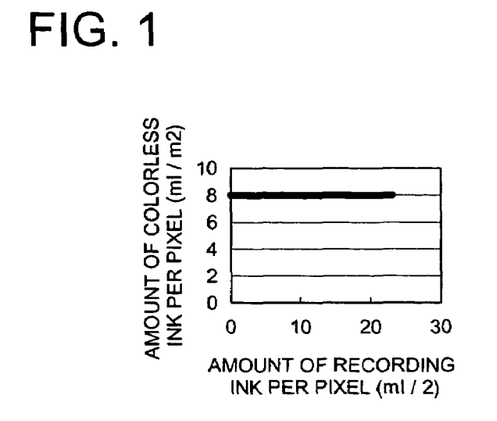
FIG. 1 is a view showing the amount of colorless ink to the amount of recording ink for every pixel.

FIG. 1 is a diagram showing a colorless ink amount with respect to a recording ink amount for every pixel. The colorless ink amount per pixel becomes constant in 8 ml/m$^2$ in FIG. 1 without depending on the recording ink amount per pixel.

Figure 2:
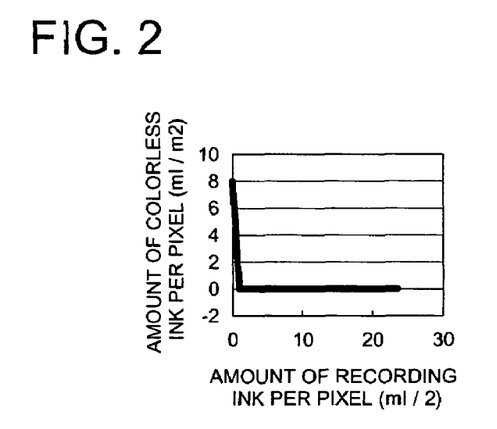
FIG. 2 is a view showing the amount of colorless ink to the amount of recording ink for every pixel.

FIG. 2 is a diagram showing a colorless ink amount with respect to a recording ink amount for every pixel, as same as FIG. 1, however in FIG. 2, the colorless ink amount per pixel is set at 8 ml/m$^2$ when the recording ink amount is set at 0 ml/m$^2$. However, the colorless ink amount is set at 0 ml/m$^2$ when the recording ink amount is greater than 0 ml/m$^2$.

Figure 3:
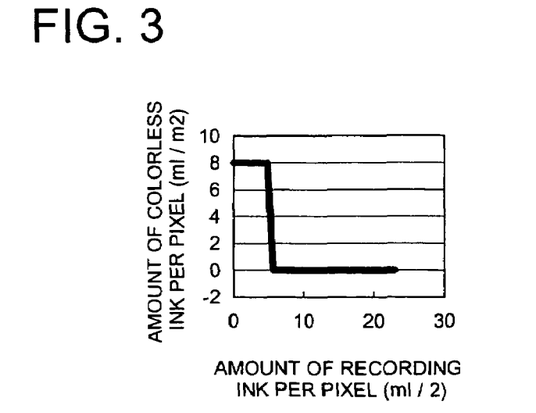
FIG. 3 is a view showing the amount of colorless ink to the amount of recording ink for every pixel.

FIG. 3 is a diagram-showing a colorless ink amount with respect to a recording ink amount for every pixel, as same as FIG. 1, however, in FIG. 3, the colorless ink amount per pixel is set at 8 ml/m$^2$ when the recording ink amount is set at 0-5 ml/m$^2$. However, the colorless ink amount is set at 0 ml/m$^2$ when the recording ink amount is greater than 5ml/m$^2$.

Figure 4:
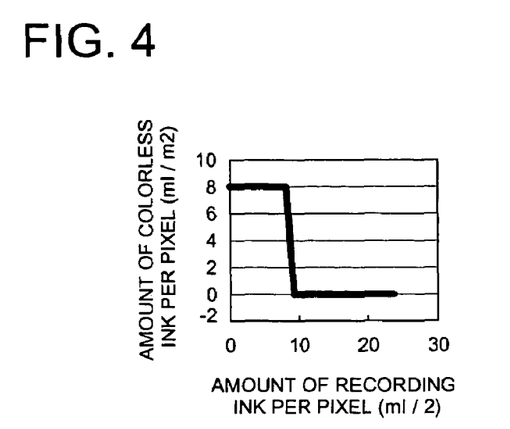
FIG. 4 is a view showing the amount of colorless ink to the amount of recording ink for every pixel.

FIG. 4 is a diagram showing a colorless ink amount with respect to a recording ink amount for every pixel, as same as FIG. 1, however, in FIG. 4, the colorless ink amount per pixel is set at 8 ml/m$^2$ when the recording ink amount is set at 0-8 ml/M$^2$. However, the colorless ink amount is set at 0 ml/m$^2$ when the recording ink amount is greater than 8 ml/m$^2$.

By setting a printing method of colorless ink as shown in FIG. 3 and FIG. 4, it may be preferable to provide the colorless ink to the portion to where a recording ink is provided at 5 ml/m$^2$ or less or 8 ml/m$^2$ or less.

Figure 5:
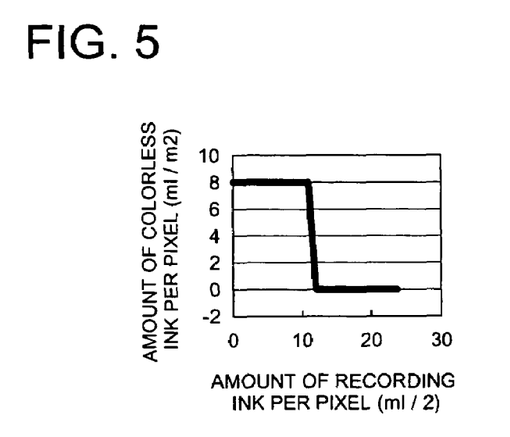
FIG. 5 is a view showing the amount of colorless ink to the amount of recording ink for every pixel.

FIG. 5 is a diagram showing a colorless ink amount with respect to a recording ink amount for every pixel, as same as FIG. 1, however, in FIG. 5, the colorless ink amount per pixel is set at 8 ml/m$^2$ when the recording ink amount is set at 0-12 ml/m$^2$. However, the colorless ink amount is set at 0 ml/m$^2$ when the recording ink amount is greater than 12 ml/m$^2$. As described above, it is preferable not to provide the colorless ink to a place to where a recording ink is provided 12 ml/m$^2$ or more. As this time, it may be preferable from a point of view to raise uniform glossiness and ozone discoloring resistance effectively to choose a pixel of 1 mm² or less as a pixel to determine whether or not colorless ink is to be provided.

Figure 6:
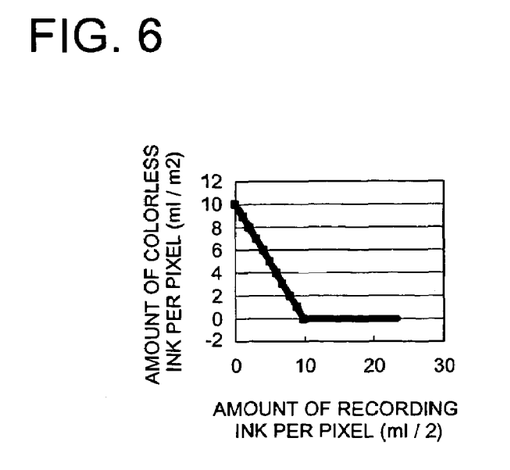
FIG. 6 is a view showing the amount of colorless ink to the amount of recording ink for every pixel.

FIG. 6 is a diagram showing a colorless ink amount with respect to a recording ink amount for every pixel, as same as FIG. 1, however, in FIG. 6, the colorless ink amount per pixel is set at 8 ml/m² when the recording ink amount is set at 0 ml/m². However, the colorless ink amount is set from 8 ml/m² to 0 ml/m² in inverse proportional to the change when the recording ink amount is changed from 0 ml/m² to 10 ml/m².

Next, a providing amount of colorless ink will be explained.

As for the providing amount of colorless ink, although a proper amount to be able to obtain effect most may be different depending on a kind of recording ink and colorless ink and characteristics of an ink-jet recording medium, it may be preferable to provide it at least 2 ml/m² or more. However, when colorless ink is provided in an amount of more than 15 ml/m², it may be not preferable, because image quality deterioration and glossiness lowering may occur. Further, it may be preferable from the aspect of the effect of the present invention to determine a providing amount of colorless ink in accordance with an amount of ink provided for each pixel. That is, it may be preferable to provide colorless ink much to a portion including a white background to where recording ink is provided in a small amout and to provide it in a small amount to a portion to where a recording ink is provided in a greater amount.

Further, it may be one of preferable methods that the total amount of a recording ink and a colorless ink for each pixel is made within a predetermine range. Further, the minimum amount of the total amount of recording ink and colorless ink is predetermined and when the amount of recording ink is smaller than the minimum amount, a providing amount of colorless ink is adjusted to supplement the shortage to the minimum amount. At this time, it is desirable for the minimum amount of the total amount to be 2 ml/m² or more, and it is more preferably 8 ml/m² or more.

Further, with the consideration for an amount of resin of resinous micro-particle included in a recording ink and a resin included in colorless ink, it may be preferable to control a-total amount of resin to be provided with both ink for each pixel. At this time, it may be preferable that the total amount of resin is 0.5 g/m² or more, and it may be more preferable 1 g/m² or more.

Next, a providing method of colorless ink will be explained. As the providing method of colorless ink, a method capable of providing it selectively at least a portion of an image may be employed, however, it may be preferable to provide it by an ink-jet head as same as recording ink. At this time, by preparing a plurality of heads for colorless ink, colorless inks having different compositions may be provided with these heads. Further, a head for colorless ink may be mounted on the same carriage of recording ink or a different carriage. Colorless ink may be provided before, at the same time, or after recording with recording ink, however, it may be preferable that the head for colorless ink is mounted on the same carriage of recording ink and colorless ink is provided as the same time with recording ink in order to obtain effect of the present invention.

As a recording medium usable with an ink-jet recording method of the present invention, a regular paper, a coated paper, a special glossy paper may used. As a preferable recording medium, when using a recording medium in which a porous type ink absorbing layer containing filler and binder as main component is provided on a waterproof type substrate such as a resin-coated paper and a film, especially when using a high glossy recording medium, it may be preferable to obtain the effect of the present invention.

As a printer usable in an ink-jet recording method of the present invention, there is no restriction if the printer comprises an ink-jet recording medium accommodating section, a conveying section, an ink cartridge, an ink-jet print head like a printer available on a market, and in addition, a colorless ink providing meas. Further, in accordance with the necessity, if the printer comprises a roll-shaped ink-jet recording medium accommodating section, a cutting section, a print sorting section and a print accommodating section, it may be preferable in a case that an ink-jet photograph is used in commercial.

As a recording head, although any one of a piezo type, a thermal type and a continuous type may be used, a piezo type may be preferable in view of ink-jetting stability. In an ink-jet recording method of the present invention, for the purpose of advancing a film formation of polymer fine particles contained in a recording ink and a colorless ink, at least one process to heat a recording medium before recording or at the time of recording, to heat a print after recording or to press may be employed.

EXAMPLE

Hereinafter, the present invention is explained in detail by showing examples, but aspects of the invention are not limited to these examples.

((Preparation of Recording Ink))

(Preparation of Ink Set 1)

With the following manners, Ink Set 1 was prepared. Ink Set 1 was composed of six color inks of yellow, magenta, cyan and black dark ink and pale color of magenta and cyan.

| (Preparation of dark color (yellow, magenta, cyan and black)) | |
|---|---|
| Diethylene glycol | 10 weight % |
| Glycerin | 10 weight % |
| Triethylene glycol monobutyl ether | 10 weight % |
| Dye (*1) | 3 weight % |
| Surfinol 465 (a product manufactured by Air Products company) | 0.5 weight % |
| Pure water | remaining parts |
| (Preparation of pale color (magenta and cyan)) | |
| Diethylene glycol | 10 weight % |
| Glycerin | 10 weight % |
| Triethylene glycol monobutyl ether | 10 weight % |
| Dye (*2) | 0.8 weight % |
| Surfinol 465 | 0.5 weight % |
| Pure water | remaining parts |

*1: With regard to dye, Yellow 86 was employed as yellow, Direct Red 227 was employed as magenta, Direct Blue 199 was employed as cyan, and Hood Black 2 was employed as black.
*2: As a dye, Direct Red 227 was employed as magenta, and Direct Blue 199 was employed as cyan.

(Preparation of Ink Set 2)

Ink Set 2 was prepared with the same manner as preparation of Ink Set 1 (six-color ink) except that Superflex 300 (a urethane latex manufactured by Dai-Ichi Kogyo Seiyaku Co., Ltd.,) was added to each ink to result in a content of 1 weight % as solids in ink.

(Preparation of Ink Set 3)

Ink Set 3 was prepared with the same manner as in preparation of Ink Set 2 (six-color ink) except that dye of dark color magenta ink and dye of light color magenta ink were replaced with anthrapyridon dye (M3).

M3

(Preparation of Ink Set 4)

Ink Set 4 was prepared with the same manner as in preparation of Ink Set 2 (six-color ink) except that dye of dark color magenta ink and dye of light color magenta ink were replaced with Heterocycle azo dye (M2).

M2

(Preparation of Ink Set 5)

Ink Set 5 was prepared with the same manner as in preparation of Ink Set 2 (six-color ink) except that dye of dark color cyan ink and dye of light color cyan ink were replaced with (C1).

C1

(Preparation of Ink Set 6)

Ink Set 6 was prepared with the same manner as in preparation of Ink Set 2 (six-color ink) except that triethylene glycol monobutyl ether was replaced with 1,2-hexanediols in the same amount.

| (Preparation of Colorless Ink 1) | |
|---|---|
| Polyvinyl alcohol (PVA 105, manufactured by KURARAY CO., LTD.) | 1 weight % |
| Ethylene glycol | 20 weight % |
| Surfinol 465 (a product manufactured by Air Products company) | 1 weight % |
| Pure water | remaining parts |
| (Preparation of Colorless Ink 2) | |
| Diethylene glycol | 10 weight % |
| Glycerin | 10 weight % |
| Triethylene glycol monobutyl ether | 10 weight % |
| Superflex 300 (urethane latex manufactured in Dai-Ichi Kogyo Seiyaku Co., Ltd.,) | 1 weight % as solid component |
| Surfinol 465 (a product manufactured in AirProducts company) | 0.5 weight % |
| Pure water | remaining parts |

(Preparation of Colorless Ink 3)

Colorless Ink 3 was prepared with the same manner as preparation of Colorless Ink 2 except that triethylene glycol monobutyl ether was replaced with 1,2-hexanediols in the same amount ((Image Recording))

(A Recording Medium)

Image recording was performed by employing PICT Rico HI-GI OSS (a product manufactured in Asahi Glass Co., Ltd.).

(Image Printing)

Ink-jet image recording was conducted by means of printer equipped with seven recording heads (piezo type: 512 nozzle) on a carriage. With combinations as described in Table 1 in detail, images were formed in such a way that each of the prepared Ink Sets comprising six colors was jetted on a recording medium from six recording heads, and each colorless ink was jetted from one remaining recording head in accordance with ink providing method (printing method) as described in Table 1.

Incidentally, "No." of printing method means that printing was conducted based on a setting explained in FIG. 1-FIG. 6 mentioned above.

Namely, Printing Method No. 1 was based on the setting shown in FIG. 1, printing Method No. 2 was based on the setting shown in FIG. 2, printing Method No. 3 was based on the setting shown in FIG. 3, printing Method No. 4 was based on the setting shown in FIG. 4, printing Method No. 5 was based on the setting shown in FIG. 5, and Printing Method No. 6 was based on the setting shown in FIG. 6.

((Evaluation of Recording Image))

About each recorded image, each of the following evaluations was done.

(Evaluation of Ozone Discoloring Resistance)

Prepared neutral gray images (each having a reflection density of 0.9 for yellow, magenta, cyan) and a cyan solid image of a cyan optical density of 0.5 were left in an ambience of an ozone concentration of 8 ppm (25° C. and 50%) for 20 hours, images after fading were compared in visual observation with image before fading, evaluation of ozone discoloring resistance was conducted based on the following criteria.

5: After discoloring process, density change of the imaging area was not recognized at all 4: After discoloring process, density change of the imaging area was not almost recognized 3: After discoloring process, density change of the imaging area was slightly recognized 2: After discoloring process, density change of the imaging area was recognized 1: After discoloring process, density change of the imaging area was remarkably recognized Further, visual observation was conducted for the boundary area section between the neutral gray image and the white background section and ozone discoloring resistance was evaluated based on the following criteria.

5: On the boundary area section between neutral gray image and white background section, no color change was observed 4: On the boundary area section between the neutral gray image and the white background section, color change was not almost observed 3: On the boundary area section the neutral gray image and the white background section, color was slightly shifted to red with allowable range 2: Only on the boundary area section-the neutral gray image and the white background section, color was faded and changed to red 1: Only on the boundary area section the neutral gray image and the white background section, color was remarkably faded and changed from yellow to orange (Evaluation of Beading)

Maroon ten steps of wedge image were printed, and the number of the wedge stage in which beading occurred was obtained. Optical density of the wedge image was the highest in ten stage, when beading did not occurred in the ten stage, "No" was indicated.

(Evaluation of Blurring of White Boundary Area)

An image having a white small circle was printed on a black solid image, then the white boundary area section was observed with hand magnifier and visual observation, and Evaluation of blurring of white boundary area section was conducted on the basis of the following criteria.

4: White boundary area section was smooth even with the observation by hand magnifier and no blurring was observed 3: Blurring was observed slightly with the observation by hand magnifier, however, was not observed with visual observation 2: Blurring was observed slightly with visual observation within a practical allowable range 1: Remarkable large blurring was observed on white boundary area section with visual observation (Evaluation of Bleeding Resistance)

After images in which thin lines of yellow, magenta, cyan and black were printed, were preserved under ambient of 40° C. and 80% RH for five days, visual observation was conducted for the degree of bleeding of each fine line image and bleeding resistance was evaluated on the basis of the following criteria.

5: On all color fine line images, no bleeding was observed at all

4: On one color ink image, slight broadening of the thin line was observed, however, no change was observed at all on other ink images 3: On ink images of several kinds of colors, slight broadening of the thin line was observed, however, it was within practical allowable range 2: On ink images of several kinds of colors, broadening of the thin line was observed 1: On all color ink images, appreciable broadening of the thin line was observed (Evaluation of Tackiness Resistance)

After prints in which each color solid image was printed were put in an album and were preserved under ambient of 30° C. and 80% RH for one month, the situations when the prints were peeled off from the album were observed, tackiness resistance was evaluated based on the following criteria.

5: It was peeled off smoothly without any tackiness

4: Slight tackiness was observed, however it was peeled off easily

3: Tackiness was observed, however it was able to be peeled off

2: Appreciable tackiness was observed, and defect occurred a part of the image surface when peeled off 1: Tackiness was severe and it was not able to be peeled off (Evaluation of Glossy Evenness)

For each of the solid black images and the white background section, C-value (%) at a reflection 60 degrees, and optical comb of 2 mm was measured with image clarity measuring instrument ICM-1DP (a product manufactured in Suga examination machinery company), glossiness difference between the solid black image and the white background section was obtained and it was used as a scale for uniform glossy. Results obtained in above items are indicated in Table 1.

As can be appreciable from the results in Table 1, The images formed by the ink-jet recording method of the present invention in which recording ink containing resinous micro-particle dispersion and a colorless ink containing a resin are printed respectively with respective recording means, is enhanced in ozon discoloring resistance and uniform glossiness in various optical density regions and different imaging regions and is refrained from image quality deterioration due to occurrences of white boundary region blurring, bleeding, and tackiness in comparison with comparative images.

What is claimed is:

1. An ink-jet recording method of recording an ink-jet recording ink containing at least a water-soluble dye and a resinous micro-particle dispersion on an ink-jet recording medium, comprising steps of:
providing a colorless ink on at least a part of the ink-jet recording medium by a liquid providing section separately installed from a recording section for the ink-jet recording ink, wherein the colorless ink contains at least a resin and is substantially colorless; and the resinous micro-particles contained in the recording ink have an average particle diameter of 10 to 200 nm.

2. The ink-jet recording method of claim 1, wherein a provided amount of the colorless ink for the ink-jet recording medium is adjusted in accordance with a provided amount of the ink-jet recording ink for each recording portion.

3. The ink-jet recording method of claim 1, if wherein the resin contained in the colorless ink is a resinous micro-particle solution.

4. The ink-jet recording method of claim 1, wherein the water-soluble dye is an anthrapyridone dye represented by a general formula (1) or a general formula (2)

TABLE 1

| Image No. | Recording Ink Set No. | Colorless Ink No. | Printing Method | Neutral Image | Cyan Low Density | Area of white Background | Ozon dicoloring Resistance Boundary Beading Resistance (stage number) | Blurring in White Boundary Area | Bleed Resistance | Tackiness Resistance | Glossiness in Image Portion | Glossy evenness Glossiness in White Background | Glossiness Difference | Remarks |
|---|---|---|---|---|---|---|---|---|---|---|---|---|---|---|
| 1 | 1 | — | — | 1 | 1 | 1 | 8 | 3 | 5 | 5 | 45 | 40 | 5 | Comp. |
| 2 | 1 | 1 | 1 | 3 | 3 | 4 | 4 | 1 | 2 | 2 | 60 | 60 | 0 | Comp. |
| 3 | 2 | — | — | 5 | 2 | 3 | 8 | 3 | 4 | 4 | 80 | 40 | 40 | Comp. |
| 4 | 2 | 1 | 2 | 5 | 2 | 4 | 8 | 2 | 4 | 4 | 80 | 60 | 20 | Inv. |
| 5 | 2 | 1 | 3 | 5 | 2 | 4 | 8 | 2 | 3 | 3 | 80 | 60 | 20 | Inv. |
| 6 | 2 | 1 | 4 | 5 | 3 | 4 | 8 | 2 | 3 | 3 | 80 | 60 | 20 | Inv. |
| 7 | 2 | 1 | 5 | 5 | 3 | 4 | 8 | 2 | 3 | 3 | 80 | 60 | 20 | Inv. |
| 8 | 2 | 1 | 6 | 5 | 3 | 4 | 8 | 2 | 3 | 3 | 80 | 60 | 20 | Inv. |
| 9 | 2 | 2 | 4 | 5 | 4 | 5 | Non | 4 | 4 | 5 | 80 | 80 | 0 | Inv. |
| 10 | 2 | 2 | 6 | 5 | 4 | 5 | Non | 4 | 4 | 5 | 80 | 80 | 0 | Inv. |
| 11 | 2 | 2 | 6 | 3 | 3 | 3 | Non | 4 | 4 | 5 | 80 | 80 | 0 | Inv. |
| 12 | 3 | 2 | 6 | 4 | 3 | 4 | Non | 4 | 4 | 5 | 80 | 80 | 0 | Inv. |
| 13 | 4 | 2 | 6 | 4 | 3 | 4 | Non | 4 | 4 | 5 | 80 | 80 | 0 | Inv. |
| 14 | 5 | 2 | 6 | 4 | 5 | 4 | Non | 4 | 4 | 5 | 80 | 80 | 0 | Inv. |
| 15 | 6 | 2 | 6 | 4 | 3 | 4 | Non | 5 | 5 | 5 | 80 | 80 | 0 | Inv. |
| 16 | 2 | 3 | 6 | 3 | 4 | 4 | Non | 5 | 4 | 5 | 80 | 80 | 0 | Inv. |

Comp.: Comp. Example
Inv.: Inv. Example

General formula (1)

General formula (2)

5. The inkjet recording method of claim 1, wherein the water-soluble dye is azo dye which is formed by connecting a hetero ring and a hetero ring with azo group.

6. The ink-jet recording method of claim 1, wherein the water-soluble dye is metal phthalocyanine dye having an oxidation potential higher than 0.8 V.

7. The ink-jet recording method of claim 1, wherein the ink-jet recording ink contains 1,2-alkyldiol.

8. The ink-jet recording method of claim 1, wherein the colorless ink contains 1,2-alkyldiol.

9. The ink-jet recording method of claim 1, wherein the resinous micro-particles contained in the recording ink have an average particle diameter of 10 to 150 nm.

10. The ink-jet recording method of claim 9, wherein the resinous micro-particles contained in the recording ink have an average particle diameter of 10 to 100 nm.

11. The ink-jet recording method of claim 1, wherein the content of the resinous micro-particles in the recording ink is 0.2 to 10 weight %.

12. The ink-jet recording method of claim 11, wherein the content of the resinous micro-particles in the recording ink is 0.5 to 5 weight %.

13. The ink-jet recording method of claim 1, wherein the resinous micro-particles contained in the recording ink or in the colorless ink have the lowest film forming temperature of −60° C. to 60° C.

14. The ink-jet recording method of claim 1, wherein the colorless ink is provided to at least a part of a region to which a recording ink is not provided.

15. The ink-jet recording method of claim 1, wherein a provided amount of the colorless ink to the ink-jet recording medium is adjustable in accordance with a provided amount of the ink-jet recording ink for each recording pixel.

16. The ink-jet recording method of claim 1, wherein the colorless ink is provided to at least a part of pixels in which a provide amount of the recording ink for each pixel is 8 ml/m$^2$ or less.

17. The ink-jet recording method of claim 16, wherein the colorless ink is provided to at least a part of pixels in which a provide amount of the recording ink for each pixel is 5 ml/m$^2$ or less.

18. The ink-jet recording method of claim 15, wherein the colorless ink is not provided to pixels in which a provide amount of the recording ink for each pixel is 12 ml/m$^2$ or more.

19. The ink-jet recording method of claim 15, wherein a provided amount of colorless ink for a region or pixels is 2 to 15 ml/m$^2$.

20. The ink-jet recording method of claim 15, wherein the total provided amount of the recording ink and the colorless ink is adjusted within a predetermined range.

21. The ink-jet recording method of claim 15, wherein the total provided amount of the recording ink and the colorless ink is adjusted to be 2 ml/m$^2$ or more.

22. The ink-jet recording method of claim 21, wherein the total provided amount of the recording ink and the colorless ink is adjusted to be 8 ml/m$^2$ or more.

23. The ink-jet recording method of claim 15, wherein a provide amount of the colorless ink is adjusted in such a way that the provide amount of the colorless ink for each pixel is reduced in accordance with an increase of the provided amount of the recording ink for each corresponding pixel.

24. The inkjet recording method of claim 15, wherein a total amount of resin obtained by summing up an amount of resinous particle contained in the recording ink provided for each pixel and an amount of resin contained in colorless ink provided for each pixel is 0.5 g/m$^2$ or more.

25. The ink-jet recording method of claim 24, wherein the total amount of resin is 1 g/m$^2$ or more.

26. The ink-jet recording method of claim 15, wherein the pixel is a pixel of 1 mms square or less.

27. The ink-jet recording method of claim 1, wherein the ink-jet recording medium comprises a waterproof support on which a porous type ink absorbing layer containing fillers and binders as principal components is provided.

28. A recorded matter produced by the ink-jet recording method of claim 1.

* * * * *